United States Patent
Jaakkola

(10) Patent No.: US 9,349,091 B2
(45) Date of Patent: May 24, 2016

(54) ANTENNA CONSTRUCTION, FOR EXAMPLE FOR AN RFID TRANSPONDER SYSTEM

(71) Applicant: Teknologian tutkimuskeskus VTT, VTT (FI)

(72) Inventor: Kaarle Jaakkola, Espoo (FI)

(73) Assignee: Teknologian tutkimuskeskus VTT, VTT (FI)

( * ) Notice: Subject to any disclaimer, the term of this patent is extended or adjusted under 35 U.S.C. 154(b) by 0 days.

(21) Appl. No.: 14/355,850

(22) PCT Filed: Oct. 31, 2012

(86) PCT No.: PCT/FI2012/051058
§ 371 (c)(1),
(2) Date: Jul. 28, 2014

(87) PCT Pub. No.: WO2013/064741
PCT Pub. Date: May 10, 2013

(65) Prior Publication Data
US 2014/0374490 A1 Dec. 25, 2014

(30) Foreign Application Priority Data
Nov. 4, 2011 (FI) ..................... 20116088

(51) Int. Cl.
  G06K 19/06 (2006.01)
  G06K 19/077 (2006.01)
  H01Q 1/22 (2006.01)
  (Continued)

(52) U.S. Cl.
  CPC .... G06K 19/07786 (2013.01); G06K 19/07749 (2013.01); G06K 19/07754 (2013.01); H01Q 1/2225 (2013.01); H01Q 7/00 (2013.01); H01Q 9/26 (2013.01); H01Q 9/285 (2013.01); H01Q 23/00 (2013.01); Y10T 29/49016 (2015.01)

(58) Field of Classification Search
  CPC ......... H01Q 1/38; H01Q 1/2225; H01Q 1/22; H01Q 7/00; H01Q 9/26; H01Q 9/285; H01Q 1/2283; H01Q 1/243; H01Q 23/00; H01Q 9/0407; H01Q 9/0421; H01Q 9/16; H01Q 9/24; H01Q 15/0086; H01Q 1/2208; G06K 19/07749; G06K 19/07786; G06K 19/0723; G06K 19/07771; G06K 19/07779; G06K 19/0739; G06K 19/07754; G06K 19/07756; G06K 19/07794; G06K 19/07798; G06K 17/5081
  USPC .................................. 235/492, 486, 487, 493
  See application file for complete search history.

(56) References Cited

U.S. PATENT DOCUMENTS 5,289,040 A * 2/1994 Rogers .......................... 257/666
6,456,243 B1 9/2002 Poilasne et al.
(Continued)

FOREIGN PATENT DOCUMENTS

EP 1835564 A1 9/2007
EP 2256673 A1 12/2010
(Continued)

*Primary Examiner* — Thien M Le
(74) *Attorney, Agent, or Firm* — Seppo Laine Oy

(57) ABSTRACT

The invention relates to an antenna construction for an RFID chip for long ranges, which comprises a substrate, an antenna of conducting material supported by the substrate, the antenna is formed as a magnetic dipole, and coupling means for coupling the antenna to a circuit, which coupling means are formed by overlapping extensions of the antenna conductor. In accordance with the invention the antenna is formed of at least three sections each of different width W1, W2 and W3, where the sections are widest and the section is the narrowest W2 with an optimized shape.

12 Claims, 4 Drawing Sheets

(51) Int. Cl.
    *H01Q 7/00*     (2006.01)
    *H01Q 9/26*     (2006.01)
    *H01Q 23/00*     (2006.01)
    *H01Q 9/28*     (2006.01)

(52) U.S. Cl.

(56) References Cited

U.S. PATENT DOCUMENTS

| | | |
|---|---|---|
| 6,906,667 B1 | 6/2005 | Poilasne et al. |
| 7,382,323 B2 * | 6/2008 | Hu et al. ................ 343/702 |
| 7,616,120 B1 * | 11/2009 | Humes et al. ............ 340/572.1 |
| 2003/0193439 A1 * | 10/2003 | Park ........................ 343/702 |
| 2007/0024423 A1 * | 2/2007 | Nikitin et al. ............ 340/10.1 |
| 2010/0194645 A1 * | 8/2010 | Steffen et al. ............ 343/700 MS |
| 2013/0328641 A1 * | 12/2013 | Komori et al. ............ 333/137 |

FOREIGN PATENT DOCUMENTS

| | | |
|---|---|---|
| FR | 2905780 A1 | 3/2008 |
| WO | WO2011033172 A1 | 3/2011 |

* cited by examiner

ANTENNA CONSTRUCTION, FOR EXAMPLE FOR AN RFID TRANSPONDER SYSTEM

FIELD OF INVENTION

The present invention relates to an antenna construction for an RFID chip for long ranges. The invention relates also to a method for forming an antenna. The antenna is used, for example, with remote-identifier circuits.

BACKGROUND OF INVENTION

So far the market of UHF RFID transponders has been divided into cheap labels and more expensive rigid tags that are applicable also on metal platform. The typical rigid transponders are large and expensive and thus applicable only on big and expensive items. Some small rigid tags have entered the market but with significantly lower performance than the big ones.

On today's market, there are already some small metal-mountable RFID transponders available. In this context, "small" can be defined as the footprint area of the transponder being less than 10 cm$^2$ and the maximum dimension being less than quarter of the wavelength (86 mm@867 MHz). Generally, the problem with these small tags is that making a transponder small in size always leads to some compromises. Practically, these compromises reduce the read range which is the key parameter for evaluating the reliability and performance of a passive RFID system.

First of all, the radiation efficiency of the transponder is reduced by the size limitation. This is basically a physical fact that cannot be fully overcome, the effect can only be minimized by e.g. optimal materials. But with very small antennas, the poor impedance match between the microchip and the antenna typically causes even greater part of the loss in read range than the reduced radiation efficiency. The conjugate impedance coupling between the antenna and the microchip that is needed for optimal operation typically cannot be achieved with a very small antenna and the current methods. The most typical solution with very small tags is to provide only reactive coupling, which is a partial solution. In the case of more complex radio systems with antennas, such as mobile devices and base stations, this impedance match needed is often achieved using discrete components (capacitors and inductors) or microstrip elements. For small RFID tags, microstrip elements are a way too large. Discrete components would be small enough, but they are out of question for cost and processability reasons.

The small metal-mount transponders existing on today's market have somewhat compromised performance. Additionally to the low radiation efficiency of the small antenna, their read range is remarkably decreased by the poor impedance match between the microchip and the antenna.

There are several different types of RFID transponder: passive, semipassive (or battery assisted passive) and active, as well as those to which a connection can be made inductively, capacitively, or with the aid of a radio-frequency radiation field. Passive transponders generate the electrical energy they need from the RF field aimed at them. In active and semipassive transponders, there is a separate battery or other power supply. Inductively connected RFID and remote sensor systems typically operate at frequencies of 100-125 kHz or 13.56 MHz.

The most preferred embodiments of the present invention relate to passive RFID transponders readable using a radio-frequency radiation field, but the antenna type is advantageous in all applications in which the antenna is required to have a long reading distance combined with small size, and to be able to be attached to some base, for example, the surface of goods or packages. Such a surface is usually flat. The frequencies most advantageously suitable for the invention are 860 . . . 960 MHz and 2.45 GHz.

An RFID transponder is a small device comprising an antenna and a microcircuit with a memory, which transmits the contents of its memory by backscattering, when it receives a transmit command from a reading device and the reading device illuminates it with a radio signal. In a passive RFID transponder there is no battery, instead it draws the operating power it requires from the radio signal transmitted to it. The transmission of power and information between the transponder and the reading device can take place with the aid of a magnetic field, an electrical field, or a radiating radio signal. In many transponder applications, it is important for the distance between the reader and the transponder to be long—even up to several meters.

In WO 2011/033172 A1, a method of producing efficient antennas for all-platform UHF RFID transponders was introduced. The method enables fabrication of tags using a simple and low cost method that is based on using only a piece of plastic and an inlay. However, the structure is quite sensitive to fabrication tolerances and especially to certain variation that easily occurs in the folding process. More precisely, when the inlay is folded around a piece of plastic, either manually or automatically, the exact folding point of the inlay is easily varied, which changes the electrical parameters of the antenna. As the center frequency of the antenna is changed, also the read range if the transponder is compromised.

SUMMARY OF THE INVENTION

The new invention is about implementing optimized structures such that the inlay compensates the effect of the folding variation. Consequently, the invention enhances the feasibility of the former invention in producing low cost and efficient all-platform RFID transponders.

So far, transponders of this type have been fabricated only by using printed circuit board technology, which is a far more expensive method of fabrication than the simple inlay and plastic brick technique.

The present invention is intended to eliminate at least some defects of the prior art to create an entirely new type of antenna and method for manufacturing the antenna.

The invention is about technical solutions that enable a high-performance, small and low-cost all-platform transponder especially for long range operation.

The invention is based on designing the shape of the antenna area such that variation in manufacturing process causes as little variation in electrical properties of the antenna as possible.

More specifically, the antenna construction according to the invention is characterized as for an RFID chip for long ranges.

The method according to the invention is, in turn, characterized as a method for forming an antenna construction for an RFID chip for long ranges.

Considerable advantages are gained with the aid of the invention.

The invention eliminates one the most important limitations that has stood on the way of the most efficient way of fabricating the transponders of this type, namely error sources caused by the manufacturing process, especially inaccurate placement of the antenna element.

As long read range, small size, platform tolerance and low cost can be achieved by the present invention.

Lots of e.g. metal objects can be tagged with a transponder that is a lot smaller and cheaper than transponders so far with corresponding read range.

The antenna type is therefore immune to the surface to which it is attached. The antenna type according to the embodiments of the invention is also economical to manufacture. In addition, the sensor structure can also be easily and at low cost combined, for example with RFID electronics.

In the following, the invention is examined with the aid of examples of embodiments according to the accompanying figures.

DETAILED DESCRIPTION

In general the invention relates to using magnetic dipole as an antenna (radiator) in a long range RFID transponder. In the advantageous solution of the invention, conjugate impedance match is formed from the radiator to the microchip by a capacitive impedance transformer by integrated part of the antenna. The resistive part of the feed impedance of a small magnetic dipole (loop) antenna is very low. Reactance of this type of an antenna is positive and very high compared to the resistance. The impedance of the microchip, on the other hand, is capacitive and the real part is higher than the one of the non-matched loop antenna. This makes it possible to achieve perfect conjugate impedance match between the magnetic dipole antenna and the microchip by using a capacitive impedance transformer. The new way of making the antenna provides this capacitive transformer and thus perfect impedance match as a part of the antenna without any external elements.

Figure 1:
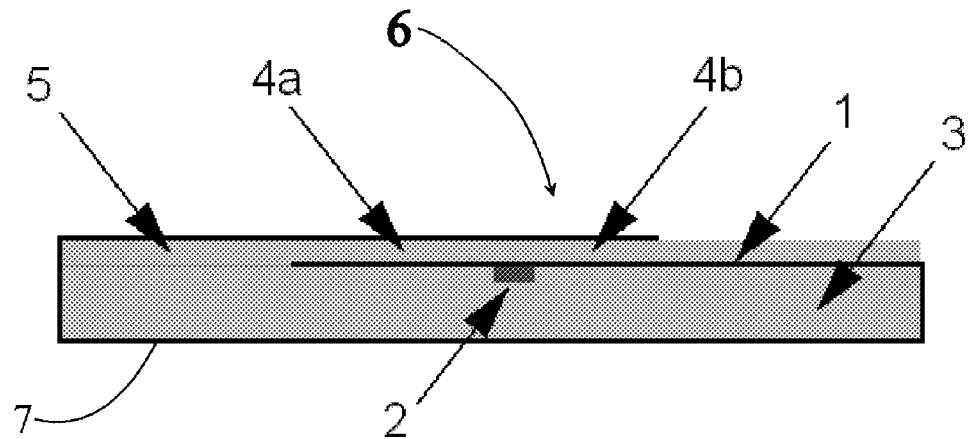
FIG. 1 shows a cross section view of a 3D transponder implemented by folding an inlay around pieces of plastic suitable for the invention.

The structure of FIG. 1 is fabricated by bending an antenna conductor, in this case a foil inlay 1 around a substrate 3 in a form of plastic brick 3. The inlay 1 contains the metal pattern on a thin plastic carrier foil 5 and the microchip 2. This thin and flexible inlay 1 is wrapped around a plastic brick 3 for forming the antenna structure and the impedance forming capacitors 4a and 4b. The impedance transforming capacitors 4a and 4b are formed by the inlay 1 overlapping itself in areas 4a and 4b. Referring to above, one idea of the invention is to make the upper and lower electrodes of each connection capacitor asymmetric such that one electrode, typically the one on the top of the transponder is larger and the other, smaller one is manufactured on the area of the larger electrode. By this way the smaller electrode defines the capacitance value of the capacitor. The inlay 1 forms also an antenna structure 6 in this solution. In the antenna structure 6 the conducting material of the inlay 1 forms integrated capacitors Cs (equivalent to 4a) and Cp (equivalent to 4b) together with the upper substrate 5 and the radiating part 7 together with the substrates 3 and 5. In other words the actual antenna radiator 7 is formed by the substrates 3 and 5 and the part of the inlay 1 not including the capacitors 4a and 4b.

The invention is about an all-platform UHF RFID transponder (or tag) which is small in size but still provides a long read range. The invention also contains solutions to enable low-cost and high-repeatability manufacturing process of the transponder. The good performance and platform tolerance is based on utilizing magnetic dipole as the radiator and even more importantly, providing conjugate impedance match between the antenna and the microchip. This is typically difficult with very small transponders. The impedance match is achieved with a new way of implementing an impedance transformer. This is achieved with standard processes and inexpensive and common materials.

The structure essentially comprises the parts shown in FIG. 1 (cross section view): the inlay 1, the microchip 2, lower dielectric 3 and the upper dielectric 5. The capacitances needed to obtain the right impedance and operation frequency are formed by the ends of the inlay overlapping each other, 4a and 4b. As mentioned above, the inlay forms also the radiating part of the antenna 1.

Figure 2:
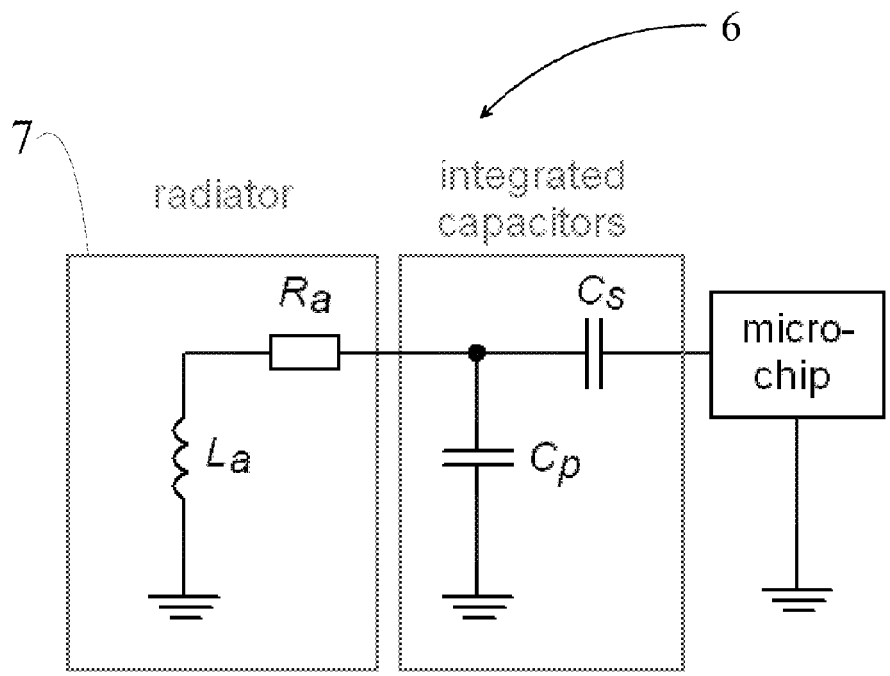
FIG. 2 shows an electrical equivalent circuit of the 3D transponder of FIG. 1.

The electrical equivalent circuit of the tag is shown in FIG. 2. The actual radiating part of the antenna consists of the antenna resistance Ra (sum of loss and radiation resistance) and the antenna inductance La. The radiator is a loop that is small compared to wavelength, which makes it inductive. The capacitive impedance transformer is then needed to set the right impedance for the microchip. The series capacitor Cs is equivalent to 4a of FIG. 1 and the parallel capacitance Cp is equivalent to 4b. When wrapping the inlay around the plastic part, the most common assembly variation comes from the change of the actual folding point. Folding the rather stiff PET inlay around the thin plastic also results in a round fold instead of right-angled one (as in FIG. 1).

Figure 3:
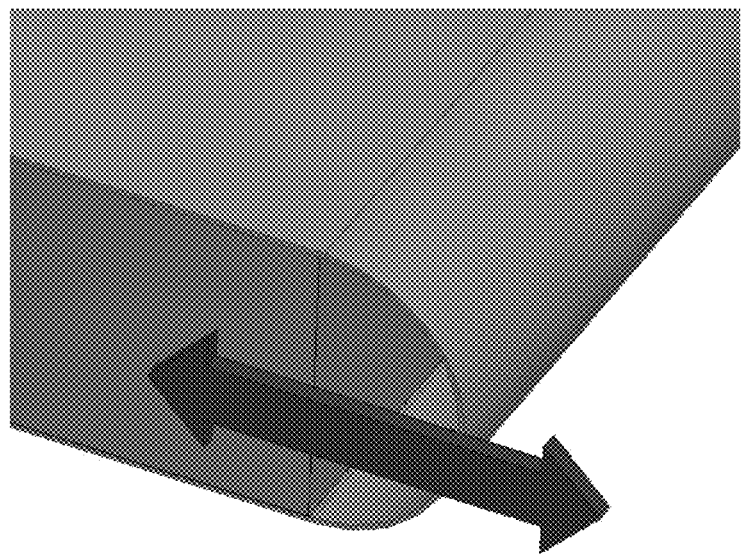
FIG. 3 shows a folding an inlay around the plastic brick and the typical variation ("folding error", le).

The realized fold together with an arrow showing the typical variation is illustrated in FIG. 3. Increasing the length of the antenna loop by moving the folding point towards right (as shown in FIG. 3), increases the antenna inductance thus lowering the operation frequency. By simulations of an example case, the magnitude of this effect is about 1.5 MHz/0.1 mm in the center frequency. On the other hand, the same folding error also affects the capacitance Cp by changing the effective area of 4b. In fact, when using a simple inlay, the effect due to the changed capacitance is clearly stronger than the effect of the changed inductance, about 12 MHz/0.1 mm in the example case. However, since these effects occur in the opposite directions, it was found by simulations that the inlay design can be optimized so that these phenomena compensate each other.

Figure 4:
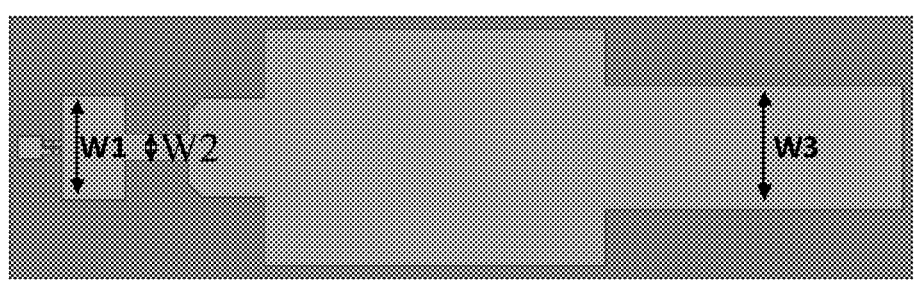
FIG. 4 shows an improved inlay design for the 3D transponder for better tolerance of the folding error in accordance with the invention.
Figure 5:
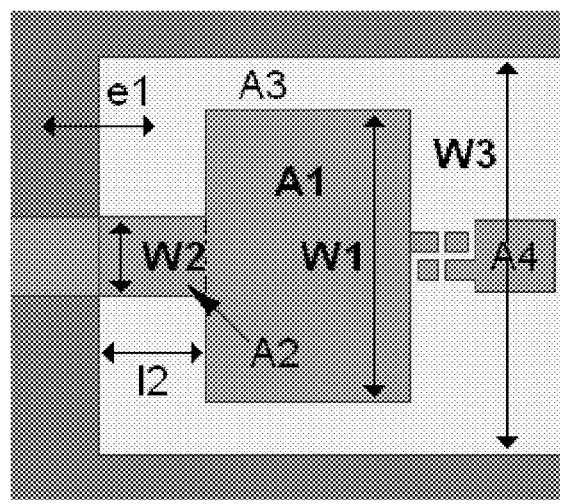
FIG. 5 shows critical dimensions and areas of the antenna structure that define the component values as a top view of the center part of a readily folded transponder in accordance with the invention.

Example of a simple inlay compensating the folding error is shown in FIG. 4 and the principle of the solution is illustrated in FIG. 5. First of all, to tolerate all lateral variation in the alignment between the metal layers, the area A1 of FIG. 5 should always be within the area of the top metal (A3) and the width W1 should be lower than the width W3. In order to obtain the compensation of the folding error effect, the width W2 should be optimized. As the capacitance effect of a simple inlay is clearly stronger than the inductance effect, W2 is, depending on the other dimensions of the transponder, practically always narrower than W1.

In other words the antenna construction for an RFID chip 2 comprises a substrate 3, an antenna conductor 1 of conducting material supported by the substrate 3, the antenna is formed as a magnetic dipole, and coupling means 4a, 4b for coupling the antenna to a circuit 2, The coupling means 4a, 4b are formed by overlapping extensions A1, A2, A3 and A4 of the antenna conductor 1. The four sections A1, A2, A3 and A4 are typically each of different width W1, W2, W3 and W4. W3 is typically widest and W2 is the narrowest.

The capacitances shown in FIGS. 1, 2 and 5 are equivalent to each other as listed in Table A2.1.

TABLE A2.1

Equivalencies between capacitances in different FIGS.

| Function | FIG. 1. | FIG. 2. | FIG. 5. |
| --- | --- | --- | --- |
| parallel tuning capacitance | 4b | Cp | A1 + A2 = A1 + w2 * l2 |
| serial tuning capacitance | 4a | Cs | A4 |

In the implementation according to the invention, the parallel capacitance Cp (4b) consists of constant and adjustable part, the capacitances of which are summed due to parallel coupling: Cp=Cpc+Cpa The constant part of Cp, named Cpc, is determined by the area A1 of FIG. 5:

$$Cpc = \frac{\varepsilon_0 \varepsilon_r^* A1}{t}, \quad (1)$$

where e0 is the permittivity of vacuum, er is the relative permittivity of the substrate material and t is the thickness of the upper dielectric of the antenna (5 in FIG. 1). The adjustable part Cpa is determined by the area A2 that is a product of W2 and l2 that varies due to the folding error as the edge e1 (shown in FIG. 5) moves:

$$Cpa = \frac{\varepsilon_0 \varepsilon_r^* W2 * l2}{t} \quad (2)$$

The robustness of the structure to the possible folding error is based on keeping the reactive part of the antenna impedance visible to the microchip constant even if the folding point moves. As capacitance Cs is kept constant by the design (In FIG. 5, A4 is always well within area A3) and is connected in series with the rest of the antenna circuit, the reactance of the equivalent circuit of FIG. 2 is kept constant if the reactance of the subcircuit consisting of La, Ra and Cp is kept constant. In one embodiment of the invention the solution is based on optimizing the antenna pattern so that the increase of La reduces the value of Cp (more precisely Cpa) so that the reactance of the above mentioned subcircuit remains constant. The reactance of the whole antenna circuit of FIG. 2 can be written:

$$X = \frac{(Xa + Xp)XaXp + Ra^2 Xp}{Ra^2 + (Xa + Xp)^2} + Xs, \quad (3)$$

where Xa, Xp and Xs are the reactances of La, Cp and Cs respectively. Because in the case of a small loop antenna Ra<<Xa, the reactance can be written with good accuracy by using only the reactive components:

$$X \approx \frac{XaXp}{Xa + Xp} + Xs \quad (4)$$

Cp can be now written as a function of X, Xs, angular frequency w and La.

$$Cp \approx \frac{X - Xs - La\omega}{(X - Xs) * \omega^2 La} = \frac{1}{\omega^2 La} - \frac{1}{(X - Xs)\omega} \quad (5)$$

In a practical design case X, Xs, and w are constant. Consequently, (5) defines the Cp needed as a function of La. The 'folding error' is now defined as the movement of the folding point towards right as shown in FIG. 3. Therefore folding error le of 1 mm produces 2 mm increment to the loop length and moves the edge e1 2 mm to the right (FIG. 5). W2, being dependent on the changing of Cp vs. folding error le, can be defined in a differential form (note that Cpc is constant, resulting in dCP/dle=dCpa/dle):

$$w2 = \frac{t}{\varepsilon_0 \varepsilon_r^* 2} \frac{dCp}{dle} \quad (6)$$

La is in practice directly proportional to the loop length:

$$La \propto l0 + le, \quad (7)$$

where l0 is the effective length of a tightly (correctly) folded inlay. By combining this approximation with (5) and (6) we obtain:

$$w2 \propto \frac{1}{le^2} \quad (8)$$

EXAMPLE

All the parameters listed above depend on the actual implementation; the size and materials of the antenna as well as the microchip. For an example, we take a UHF RFID microchip with the feed impedance of Z=15−j150Ω@867 MHz and design an antenna for that. The overall size of the antenna is 30 mm*20 mm*2.7 mm. The thickness of the upper dielectric t is 0.2 mm and the relative permittivity $\in_r$ of the substrate material is 2.2. Then we calculate the dimensions of the inlay metal pattern so that the antenna is robust to the folding error or more precisely, we calculate w2 as a function of folding error le.

Figure 7:
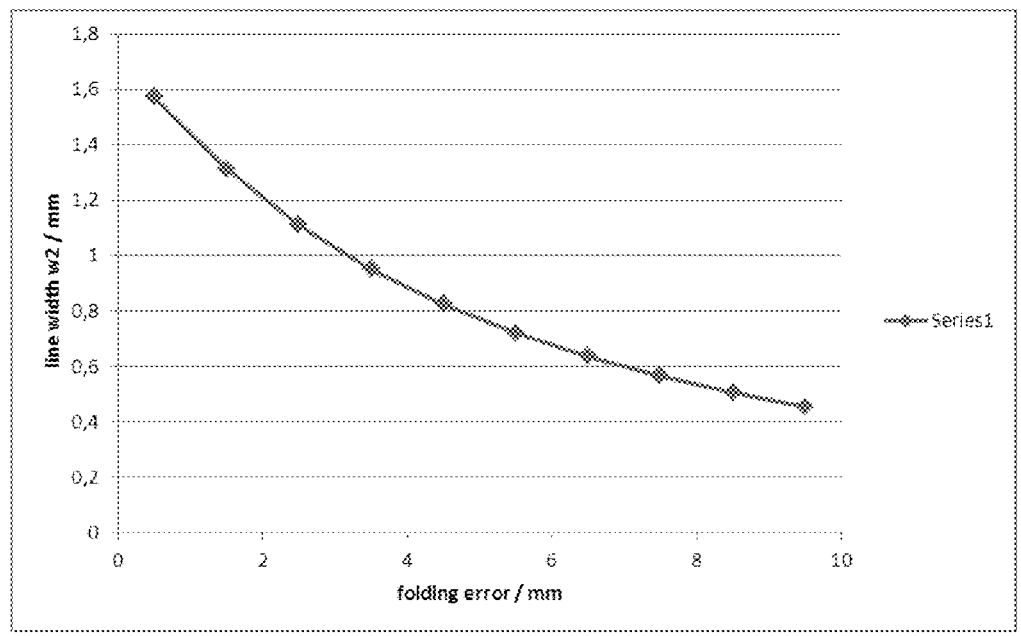
FIG. 7 shows graphically Line width w2 (as defined in FIGS. 5 and 6) of an example case of a UHF RFID transponder as a function of folding error le.

For conjugate coupling, the antenna impedance needed is 15+150Ω. Thus, X=150Ω. Optimization of the antenna impedance by simulation gives the other component values:
La=10 nH
Cp=3.1 pF
Cs=0.35 pF We get the La vs. le dependency by simulations, so we do not need to use the approximation (7). Then, combining the simulation data (La vs. le and the other component values) with (5) and (6), we can calculate and draw the w2 vs. le curve shown in FIG. 7

Figure 6:
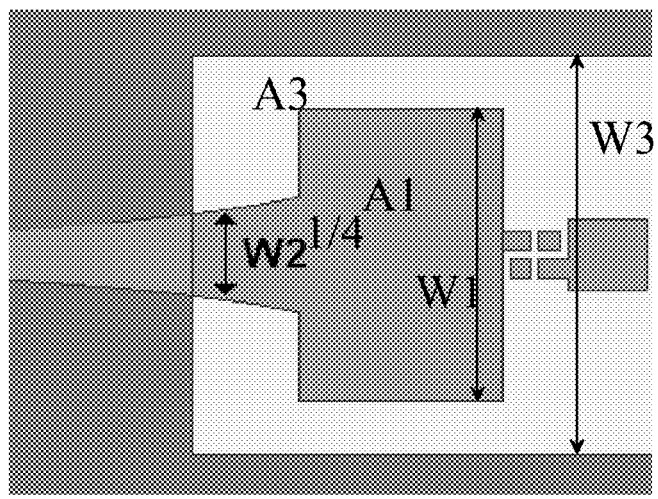
FIG. 6 shows an example of a realized antenna inlay in which width w2 at the edge e1 changes as a function of folding error, producing optimized impedance compensation of the folding error.

The shape of the curve is very close to what it should be by (8). This dependency between w2 and le produces the shape of an inlay pattern as shown in FIG. 6. As a result, the transponder should be tolerant to folding errors of several millimeters. Even though the example case is about RFID transponder, the microchips of which require a certain impedance value, the method is very flexible, making it possible to implement the robustness to folding error for various impedance values by optimizing the shape of the metal pattern accordingly. It is also well possible that e.g. width W1 is the same as W2−A1 can also be long and narrow without any stepped transition between Cpc and Cpa. The aspect ratios of A1 and A4 are mostly dependent on the other dimensions of the antenna.

The invention claimed is:

1. Antenna construction for an RFID chip for long ranges, which comprises
   a substrate,
   an antenna structure of conducting material supported by the substrate, comprising a radiator in a form of a magnetic dipole, and
   coupling means for coupling the antenna structure to a circuit, which coupling means are formed by overlapping extensions of the antenna conductor, the extensions being separated from each other by a dielectric and
wherein
   the conducting material is formed of at least three sections each of different width W1, W2 and W3, where the sections forming the actual coupling means are widest and the section functioning as connecting section between the sections forming coupling means is the narrowest.

2. Antenna construction according to claim 1, wherein the connecting section is formed of varying width.

3. Antenna construction according to claim 1, further comprising a microchip.

4. Antenna construction according to claim 1, wherein the antenna and coupling means are formed by wrapping a conducting layer around a substrate.

5. Antenna construction according to claim 1, wherein the antenna and coupling means are formed by printed circuit board technology.

6. Antenna construction according to claim 3, further comprising a conjugate impedance match between the microchip and the antenna is implemented by using a capacitive impedance transformer integrated in the antenna.

7. Method for forming an antenna construction for an RFID chip for long ranges, which method includes steps for
   forming a substrate,
   forming an antenna structure of conducting material supported by the substrate, comprising a radiator in a form of a magnetic dipole,
   forming coupling means for coupling the antenna structure to a circuit, which coupling means are formed by overlapping extensions of the antenna conductor, the extensions being separated from each other by a dielectric and
   forming the conducting material of at least three sections each of different width W1, W2 and W3, where the sections forming the actual coupling means are widest and the section functioning as connecting section between the sections forming coupling means is the narrowest.

8. A method according to claim 7, further comprising forming the connecting section of varying width.

9. A method according to claim 7, further comprising including a microchip.

10. A method according to claim 7, wherein the antenna and coupling means are formed by wrapping a conducting layer around a substrate.

11. A method according to claim 7, wherein the antenna and coupling means are formed by printed circuit board technology.

12. A method according to claim 9, wherein a conjugate impedance match between the microchip and the antenna is implemented by using a capacitive impedance transformer integrated in the antenna.

* * * * *